United States Patent
Grossfeld

(10) Patent No.: US 9,220,364 B1
(45) Date of Patent: Dec. 29, 2015

(54) SYSTEM AND METHODS FOR DISPENSING HOT BEVERAGES

(71) Applicant: Hotshot USA LLC, Port Washington, NY (US)

(72) Inventor: Daniel Grossfeld, Bayside, NY (US)

(73) Assignee: Hot Shot USA LLC, Port Washington, NY (US)

( * ) Notice: Subject to any disclaimer, the term of this patent is extended or adjusted under 35 U.S.C. 154(b) by 0 days.

(21) Appl. No.: 14/032,833

(22) Filed: Sep. 20, 2013

Related U.S. Application Data

(60) Provisional application No. 61/706,685, filed on Sep. 27, 2012.

(51) Int. Cl.
*A47J 36/24* (2006.01)
*A47G 19/22* (2006.01)
*A47J 41/00* (2006.01)

(52) U.S. Cl.
CPC ......... *A47J 36/2461* (2013.01); *A47G 19/2288* (2013.01); *A47J 41/0055* (2013.01)

(58) Field of Classification Search
CPC ...... B65D 81/343; B65D 88/00; B65D 81/38; B65D 71/00; B65D 81/3869; A47J 41/00; A47J 36/26; A47G 23/04; B67D 1/00
USPC ............. 222/129, 592, 593; 426/113; 99/483, 99/323.3, 275; 220/592.01, 592.17, 592.2, 220/592.24, 592.25, 592.26; 219/228, 433, 219/655, 689, 701, 386, 387, 430, 432; 392/403
See application file for complete search history.

(56) References Cited

U.S. PATENT DOCUMENTS

| | | | |
|---|---|---|---|
| 2,576,874 A | 11/1951 | Acton | 219/19 |
| 3,325,058 A | 6/1967 | West, Jr. | 222/146 |
| 4,523,083 A | 6/1985 | Hamilton | 219/433 |
| 4,745,248 A | 5/1988 | Hayes | 219/10.55 M |
| 4,751,368 A | 6/1988 | Daifotes | 219/432 |
| 5,060,479 A | 10/1991 | Carmi et al. | 62/362 |

(Continued)

FOREIGN PATENT DOCUMENTS

| | | | | |
|---|---|---|---|---|
| CN | 2701377 Y | 5/2005 | | A47J 39/00 |
| WO | WO 03/101268 A1 | 12/2003 | | A47J 39/02 |

OTHER PUBLICATIONS

Dragon Enterprise Co., Ltd., Mini Beverage Warmers, printed Jan. 27, 2011 (2 pages) http://www.dragon-enterprise.com/product.asp?bigclassid=26.

*Primary Examiner* — Rena L Dye
*Assistant Examiner* — Ericson M Lachica
(74) *Attorney, Agent, or Firm* — Sunstein Kann Murphy & Timbers LLP

(57) ABSTRACT

A system and method for dispensing hot beverages in single-portion beverage containers. The beverage containers are retained within a dispensing enclosure and are heated by conduction of heat from a heating surface, thereby maintaining the beverages at a specified hot temperature that is hotter than comfortable to the touch. Each individual beverage container has an internal enclosure at the temperature of the heated beverage, and an insulating surround that allows a consumer to remove the can from the dispensing enclosure without touching any hot surface. The dispensing enclosure may be portable. The single-portion beverage containers have an insulating surround which leaves the container bottom clear for thermal contact with the heating surface.

3 Claims, 5 Drawing Sheets

(56) References Cited

U.S. PATENT DOCUMENTS

| | | | |
|---|---|---|---|
| 5,301,508 A | 4/1994 | Kahl et al. ............... 62/3.62 |
| 6,192,787 B1 | 2/2001 | Montalto ............... 99/323.3 |
| 6,384,380 B1 | 5/2002 | Faries, Jr. et al. ............. 219/385 |
| 6,403,928 B1 | 6/2002 | Ford ............................. 219/432 |
| 6,412,287 B1 | 7/2002 | Hughes et al. ............... 62/3.61 |
| 6,768,085 B2 | 7/2004 | Faries, Jr. et al. ............. 219/494 |
| 6,849,835 B2 | 2/2005 | Bollmers et al. ............. 219/520 |
| 7,082,773 B2 | 8/2006 | Cauchy ............................. 62/3.3 |
| 2006/0277924 A1 | 12/2006 | Platkin ............................. 62/3.3 |
| 2008/0006629 A1 | 1/2008 | Roth et al. ..................... 220/215 |
| 2009/0026213 A1* | 1/2009 | McCarthy ................... 220/592.2 |
| 2014/0021207 A1* | 1/2014 | Noble et al. .............. 220/592.17 |

* cited by examiner

SYSTEM AND METHODS FOR DISPENSING HOT BEVERAGES

The present application claims the priority of U.S. Provisional Application No. 61/706,685, filed Sep. 27, 2012, which is incorporated herein by reference.

TECHNICAL FIELD

The present application relates to beverage dispensing, and, more particularly, to the packaging and dispensing of single-serve beverages that have been heated to, and maintained at, temperatures above a specified temperature for an extended period of time so as to be available for immediate consumption.

BACKGROUND OF THE INVENTION

Certain systems for dispensing individual portions of a heated liquid for consumption as a beverage have been in use since the late 1960s, including systems marketed by UUC UESHIMA COFFEE CO., LTD. and POKKA SAPPORO Food & Beverage Ltd., both of Japan. In order to dispense hot beverages, existing technologies heat entire cans and retain them at a substantially uniform temperature such that the inside and outside of the cans are at a temperature that can be comfortably held. Alternatively, heat-on-demand technologies may be employed, whereby an exothermic chemical reaction (as between calcium oxide or calcium chloride and water) is triggered within an inner chamber of a dual-chambered can, heating a beverage in an outer container, typically within 20-30 seconds.

A drawback of current modalities of dispensing single-serve hot beverages is the limited temperature of beverage that may be dispensed. In particular, since a beverage container is withdrawn from such an apparatus by hand, if the entire container were to be heated to a uniform temperature, that uniform temperature would have to be limited to a temperature comfortably handled by a person's hand. This is disadvantageous, however, because many beverages and other food items are preferably consumed at a temperature exceeding a comfortable handling temperature.

Drawbacks of the heat-on-demand paradigm include the complexity of manufacture and the uncertainty of the temperature at which the beverage is delivered, since the triggered chemical reaction adds a fixed, predetermined quantity of heat, such that the terminal temperature depends on the temperature at which the heating process starts.

It is desirable, therefore, that an apparatus and method allow for heating a beverage to higher temperatures, and for storing it over extended periods, yet, at the same time, allowing the beverage container to be comfortably handled by a person. It is particularly desirable that such an apparatus and method be suited to a variety of situations in which a consumer may wish which to have ready access to a hot beverage. Such an apparatus and method are provided by the invention described below.

SUMMARY OF EMBODIMENTS OF THE INVENTION

In accordance with various embodiments of the present invention, a system is provided for dispensing a plurality of individual hot beverages. The system has a dispensing enclosure adapted to retain a plurality of beverage containers, where each beverage container has a beverage enclosure and an insulating surround that leaves a portion of the enclosure exposed. The system has a heating surface disposed within the dispensing enclosure adapted to maintain thermal contact with the beverage enclosure of each of the plurality of individual hot beverages, a heater for delivering heat to the heating surface, and a thermal controller for governing the heater so as to maintain the individual hot beverages at a specified hot temperature. Finally, the system has an access port adapted to allow at least one beverage container to be removed from within the dispensing enclosure by a consumer without contact by the consumer of any surface that exceeds a normative cutaneous heat pain threshold temperature.

In accordance with certain embodiments of the present invention, the specified hot temperature may exceed 130° F., and, in other embodiments, it may exceed 140° F. The heating surface may include a surface of a shelf, either an upper or a lower surface, heating from the top or the bottom. Alternatively, the heating surface may include a surface of a rack. In some embodiments of the invention, the heating surface may be planar, while in others it may include a plurality of protuberances.

In accordance with alternate embodiments of the invention, the heater may deliver heat to the heating surface via conduction or radiatively, and the access port may be a hinged door. The insulating surround may include a plastic material, and the beverage enclosure may be metal. In further embodiments yet, the dispensing enclosure may be portable.

In accordance with another aspect of the present invention, a method is provided for dispensing a plurality of beverage containers, where each beverage container includes a beverage enclosure. The method has steps of:
  retaining the plurality of beverage containers within a dispensing enclosure;
  conductively heating at least one beverage enclosure filled with a liquid such that a temperature of the liquid exceeds a normative cutaneous heat pain threshold;
  maintaining the temperature of the liquid at a specified temperature above the normative cutaneous heat pain threshold; and
  providing for at least one beverage container to be removed from within the dispensing enclosure by a consumer such that the consumer contacts only a surface characterized by a temperature below the normative cutaneous heat pain threshold.

In accordance with alternate embodiments of the invention, heat may be transferred to an exposed surface of each of the plurality of beverage enclosures. The liquid may be a potable beverage, and the specified temperature may exceed 130° F.

In accordance with a further aspect of the present invention, a portable dispenser for hot beverages is provided. The portable dispenser has a dispensing enclosure with an interior volume of less than 2 ft$^3$, the interior volume adapted to retain a plurality of beverage containers, each beverage container comprising a beverage enclosure and an insulating surround that leaves a portion of the beverage enclosure exposed. The portable dispenser has a heating surface disposed within the dispensing enclosure adapted to maintain thermal contact with the beverage enclosure of each of the plurality of beverages, a heater for delivering heat to the heating surface, and a thermal controller for governing the heater so as to maintain the individual hot beverages at a specified hot temperature. Finally, the portable dispenser has an access port adapted to allow at least one beverage container to be removed from within the dispensing enclosure by a consumer without contact by the consumer of any surface that exceeds a normative cutaneous heat pain threshold temperature.

In accordance with other embodiments of the invention, the portable dispenser may also have a handle coupled to an outer surface of the dispensing enclosure, and the access port may be a door. The specified hot temperature may exceed 130° F. The heating surface may be a surface, such as an upper or lower surface, of a shelf. The heating surface may also be a rack, and it may be planar, or may include a plurality of protuberances.

In further embodiments of the invention, the heater may deliver heat to the heating surface via conduction. The access port of the portable dispenser may be a door.

In accordance with another aspect of the present invention, a beverage container is provided that has a thermally conductive beverage enclosure and an insulating surround, where the surround leaves a portion of the enclosure exposed. The container is configured so that when the container is placed in contact with a heating surface for heating the enclosure, the exposed portion makes direct physical contact with the heating surface. Moreover, the insulating surround is configured to maintain a sufficient temperature differential between the enclosure and the outside of the insulating surround that when the enclosure is at 140 degrees, the outside of the insulating surround can be maintained at a temperature, in ambient air, that is not hot to touch.

BRIEF DESCRIPTION OF THE FIGURES

The foregoing features of the invention will be more readily understood by reference to the following detailed description, taken with reference to the accompanying figures, in which.

DETAILED DESCRIPTION OF EMBODIMENTS OF THE INVENTION

Definitions

Figure 1:
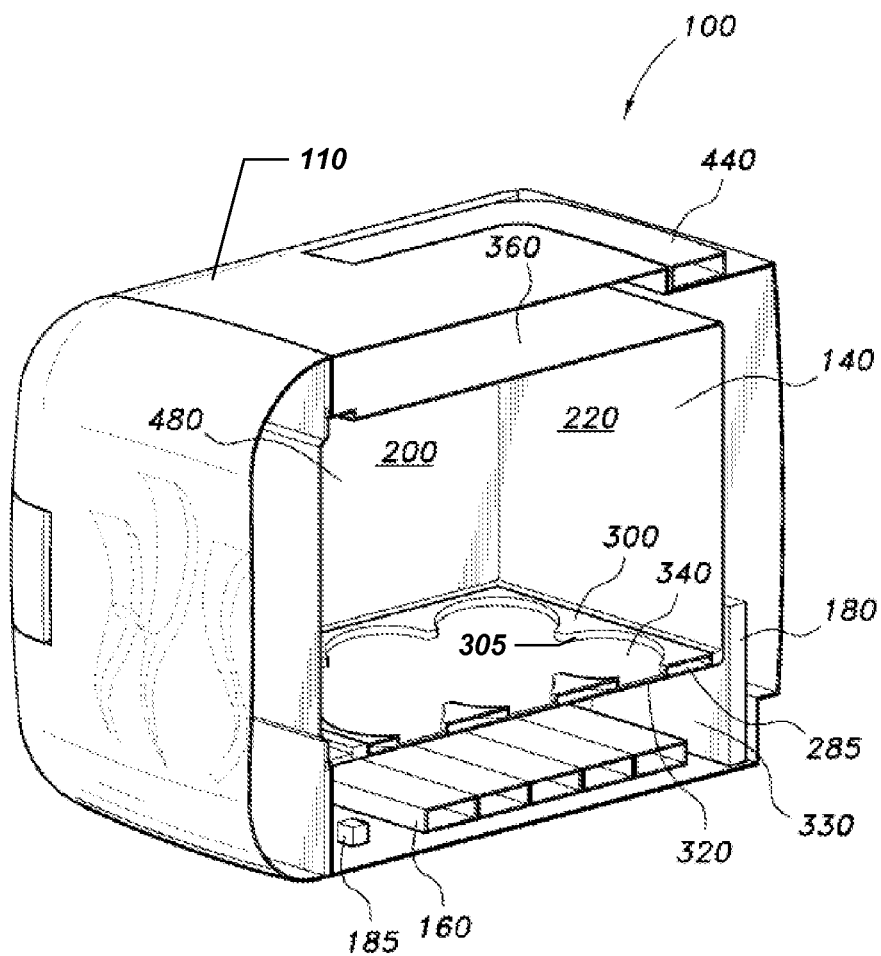
FIG. 1 provides a perspective section view of a hot beverage dispensing apparatus in accordance with a preferred embodiment of the present invention.

In the present description, and in any appended claims, the term "beverage" shall refer to any potable or edible liquid, unless otherwise required by context.

The term "beverage enclosure" shall refer to the immediate envelope of any substantially enclosed volume which contains, or may be filled to contain, a beverage in a quantity suitable for one-time human consumption. The beverage enclosure is typically a metal can, although the scope of the present invention does not so limit it. The beverage enclosure has a surface, a portion of which, as discussed below, is "exposed" to provide thermal conductivity, thus the beverage enclosure may be formed on any material currently known, or later developed, that provides, in relevant portion, for thermal conduction as described below.

The term "beverage container" shall encompass a "beverage enclosure" and shall further include any successive layers of material surrounding the beverage enclosure, in whole or in part, so as to constitute a beverage-containing unit dispensed for holding and consumption by persons. Such successive layers may include a layer of thermal insulation. A layer of thermal insulation may "surround" the enclosure even while leaving a portion of the enclosure, such as the base of the enclosure, uncovered.

The term "hot" shall refer to a temperature exceeding a normative cutaneous heat pain threshold. Thus, if an item is too hot to comfortably hold, that item may be referred to as "hot." While thermal pain thresholds vary from person to person, data are available, as in Yarnitsky et al., *Heat pain thresholds: normative data and repeatability*, Pain, vol. 60, pp. 329-32 (1995), incorporated herein by reference, such that a normative cutaneous heat pain threshold may be specified by a designer.

The term "heating surface" shall refer to a surface, which may be planar, or perforated, or any other shape, which may include extra-planar features such as heating protuberances, that serves to couple heat conductively to a one or more beverage enclosures.

In accordance with an embodiment of the present invention, a beverage dispensing system, designated generally by numeral 100, is provided, as now described with reference to FIG. 1. Beverage dispensing system 100 provides for dispensing beverages in single-serving quantities, referred to herein as individual beverages. It is to be understood that use of the term "single-serving" does not preclude reuse of a beverage container within the scope of the present invention, whether the beverage container is expressly designed for reuse, or otherwise. Beverage dispensing system 100 is based upon a dispensing enclosure 110 that may assume many forms, depending on particular applications, with a particularly advantageous portable form depicted in FIG. 1. Dispensing enclosure 110 contains at least one heating surface 300 that serves to couple heat through conduction to one or more liquid beverages (not shown) each contained within a beverage container 500 as described below with reference to FIGS. 4A, 4B and 5.

The term beverage, as defined above, may be used herein as a proxy, and without limitation, for any item for human consumption that contains a liquid component. Thus, a soup or a stew is encompassed within the scope of the present invention to the same degree as a pure liquid such as tea or coffee, hot cocoa or hot ginger ale.

Heating surface 300 may be the top surface of a shelf 305, as shown in cutaway in the depiction of FIG. 1, although, in other embodiments, it may assume other configurations such as a rack or a series of protuberances, regularly configured or otherwise. When beverage dispensing system 100 is in operation, heating surface 300 is maintained at a specified temperature such that, by virtue of thermal conduction of heat to the beverage via an intervening beverage enclosure 505 (shown in FIGS. 4A, 4B and 5), the beverage is maintained at a specified consumption temperature. Thus, for example, in order to maintain the beverage at a temperature of 140° F., heating surface 300 is maintained at a temperature that is typically about 165° F.

Heating surface 300 is heated to a requisite temperature, and maintained at that temperature, by means of a heating element 160 disposed within dispensing enclosure 110. Heating may be via conduction, as by a heating element embedded in contact with shelf 305 or embedded within shelf 305, for example, or via radiation of heat of bottom surface 320 of shelf 305 by at least one heating element 160, separated from shelf 305 by an airspace 330, or via convection of air beneath shelf 305. Electrical power supplied to heating element 160 is governed by a controller 180 to control the thermal output of heating element 160 in such a way as to maintain heating surface 300 at a specified temperature, or else to maintain a specified temperature at another location that is related in a calibrated way to the temperature of heating surface 300. It is preferred that the temperature of heating surface 300, and, by extension, of beverage enclosure 505, be maintained at a consistent temperature over periods of time that can extend from hours to months. Maintenance of the temperature within a range of ±5 F.° is particularly advantageous in that the stability and taste of the enclosed beverage is best preserved under those conditions. The controller 180 can be any suitable controller such as the controller shown in FIG. 8A in U.S. Pat. No. 6,768,085 issued to Faries, Jr., et al. At least one optional thermal sensor 185 can be fitted inside beverage compartment 140 of the dispensing enclosure 110.

Preferred beverage temperatures typically exceed 130° F. for certain beverages, and 140° F., or even higher, for others.

In certain embodiments of the invention, shelf 305 may contain an internal air space 340 for equalizing the temperature across heating surface 300, moreover one or more vent conduits 285 may be provided for directing air heated within internal air space 340.

The beverage compartment 140 comprises vertical sidewalls 200 and 220, and the beverage compartment may have at least one inner layer of insulating material 360 such as, but not limited to, polystyrene. Insulating material 360 may advantageously limit the loss of heat via housing 120 (shown in FIG. 3) of the dispensing enclosure. It should be understood that, within the scope of the present invention, the shape of the beverage compartment 140 is a matter of design choice, and that the beverage compartment can be any suitable shape. Similarly, dispensing enclosure 110 is not limited in its form factor or footprint within the present invention.

In a preferred embodiment, dispensing enclosure 110 is portable, and interior 480 of the enclosure is suited to contain a small number of individual beverages. In such a configuration, the volume of interior 480 is no greater than approximately two cubic feet. In such a configuration, as well, a handle 440 may be provided for convenient portability.

Figure 3:
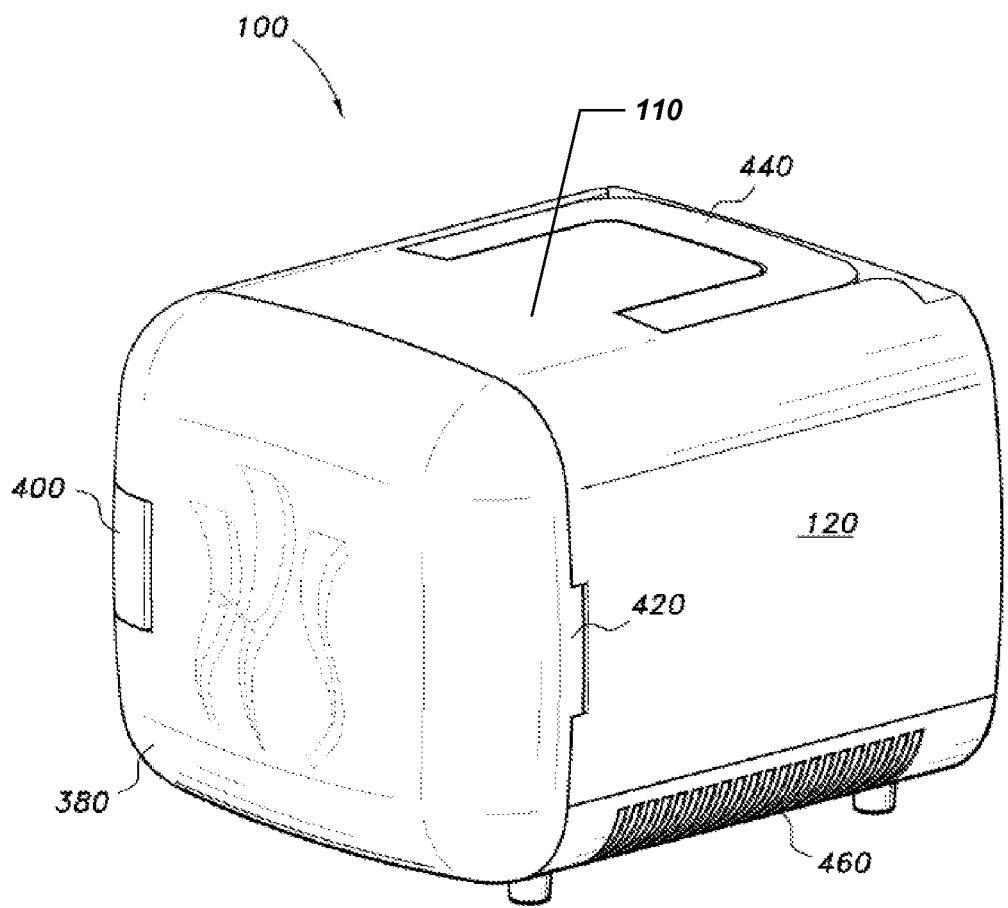
FIG. 3 is a perspective outside view of the hot beverage dispensing apparatus of FIG. 1.

Referring now to FIG. 3, dispensing enclosure 110 has an access port 380, typically a door, with a hinge 420 and a door handle 400, as shown. Access port 380 may also be a simple opening in the dispensing enclosure. Access port 380 allows a beverage consumer to withdraw an individual beverage from inside the dispensing enclosure. Ventilation throughholes 460 may be provided to prevent excessive heating of air in airspace 330 (shown in FIG. 1). By virtue of the configuration described below with reference to FIG. 5, the consumer's withdrawal of an individual beverage is accomplished without the consumer touching any surface that is hot, in the sense that no surface need be contacted that is uncomfortably hot to the touch, i.e., that exceeds any normative cutaneous heat pain threshold.

Figures 4A, 4B:
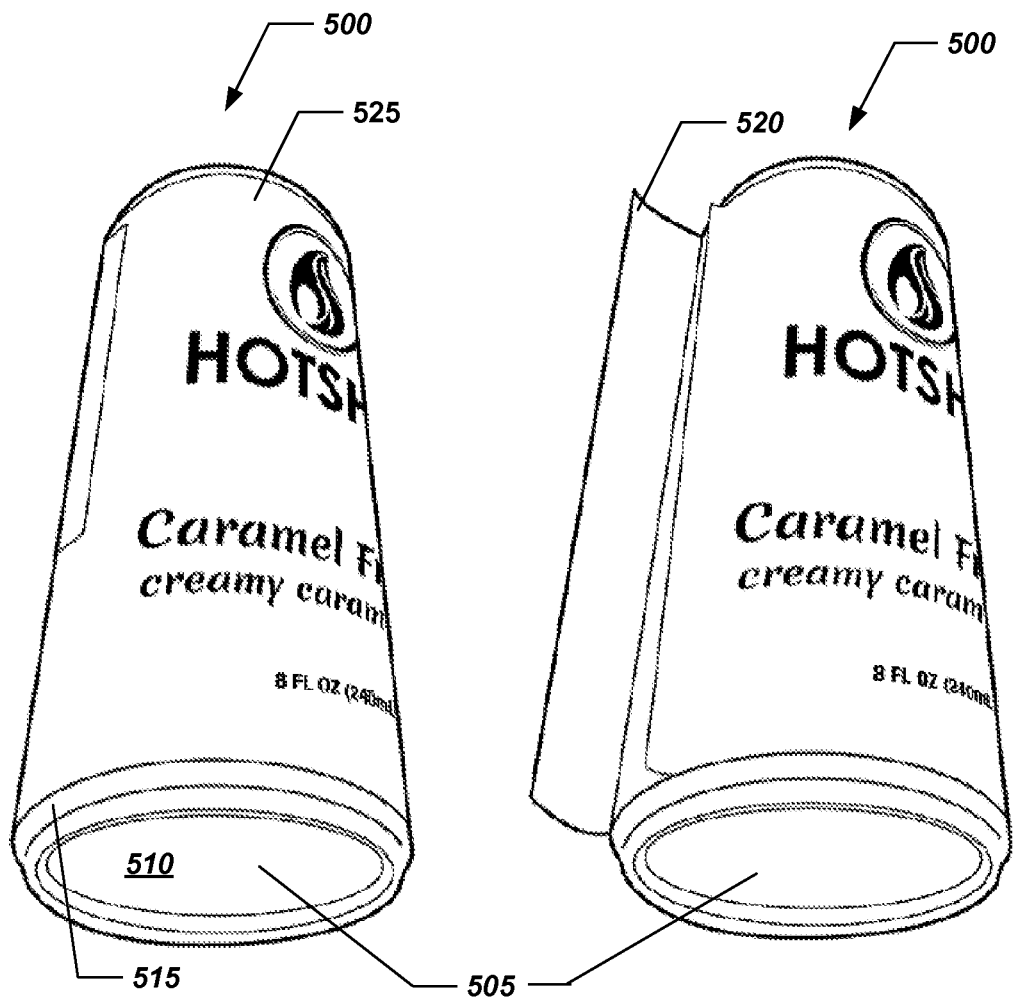
FIGS. 4A and 4B are perspective views of a beverage container, showing a lower surface of a beverage enclosure and an insulating surround, in accordance with an embodiment of the present invention.

In accordance with preferred embodiments of the present invention, beverage dispensing system 100 is preferably used to dispense beverage containers 500, as now described with reference to FIGS. 4A and 4B. Beverage container 500 has an inner beverage enclosure 505 with an interior volume holding the beverage to be dispensed. A portion (or the entirety) of beverage enclosure 505 facilitates heat conduction through the enclosure, thus it is advantageous for beverage enclosure 505 to be metallic, though it is certainly not so limited within the scope of the present invention. More particularly, beverage enclosure 505 may be steel or aluminum, as compatible with the beverage being dispensed and other considerations, but may also be formed of a single material, or of multiple materials, now known or subsequently developed. Each beverage enclosure 505 contains one individual beverage. The shape of beverage enclosure 505 is not limited within the scope of the present invention, although beverage enclosure 505 is typically a closed right cylinder, as typically referred to as a "can." Exposed portion 510 of beverage enclosure 505, which may have a concave recess, is advantageously provided with a beveled rim 515 thereby increasing conductive thermal contact with heating surface 305, as will be discussed below, with reference to FIG. 5. Beverage container 500 also has an insulating surround 520, shown unwrapped in part in FIG. 4B. Insulating surround 520 is a wrapped plastic sheet or other jacket, which may serve as a label and that is typically styrofoam on the order of 6-10 mm thick. The insulating surround is configured so that the exposed portion 510 is left uncovered by the insulating surround; in this manner, the base is in direct physical contact with the heating surface 305. The direct physical contact therefore facilitates thermal contact of the base 510 of the enclosure 505 with the heating surface 300.

While heating surface 300 is depicted beneath beverage enclosure 505, such that exposed portion 510 of the beverage enclosure is the base of the enclosure, although it is to be understood that heat may be applied from other directions, such as the top, in which case a corresponding portion of the beverage enclosure is thermally exposed.

Figure 5:
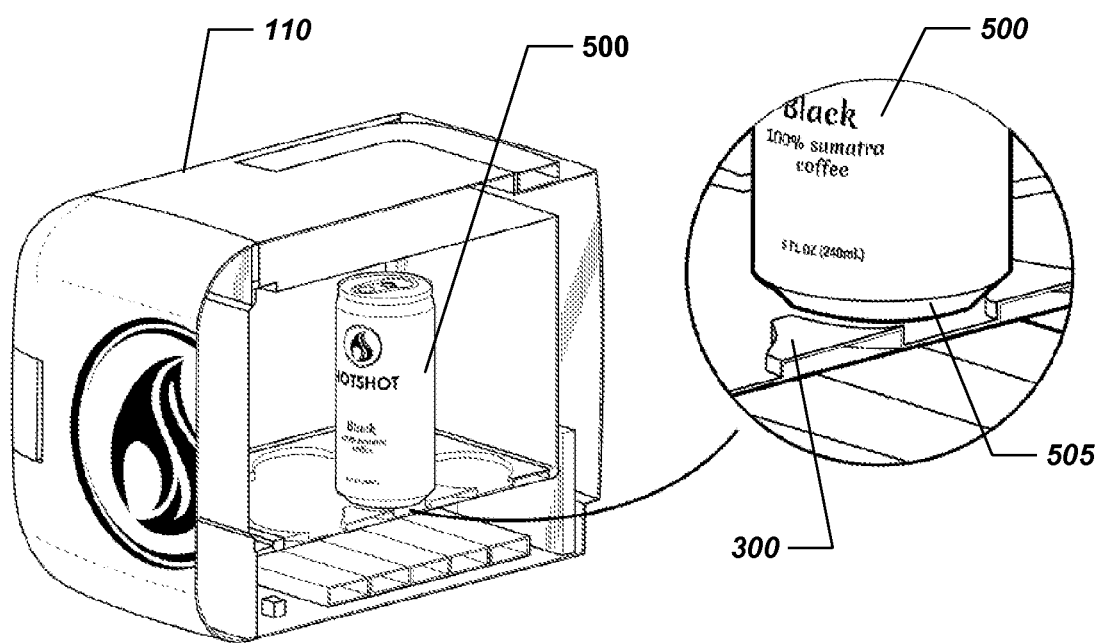
FIG. 5 shows a beverage container in thermal communication with a heating surface of a beverage dispensing apparatus, in accordance with an embodiment of the present invention.

Referring now to FIG. 5, beverage dispensing system 100 heats beverage enclosures 505 by virtue of thermal contact between the beverage enclosures and heating surface 300. Heat is transferred from heating surface 300 to the beverage enclosure, and, by conduction through the beverage enclosure 505, to the individual beverage contained therein. Beveled rim 515 (shown in FIG. 4B) may provide added contact surface between beverage enclosure 505 and heating surface 300, thereby leading to more efficient transfer of heat through beverage enclosure 505 to the individual beverage inside.

While FIG. 5 depicts heating surface 300 beneath beverage enclosure 505, with heat conducted via an exposed portion 510 constituting the base of enclosure 505, it is to be understood that such a configuration is only one possible configuration within the scope of the present invention, and that heat may be transferred in any other direction, as well.

Figure 2:
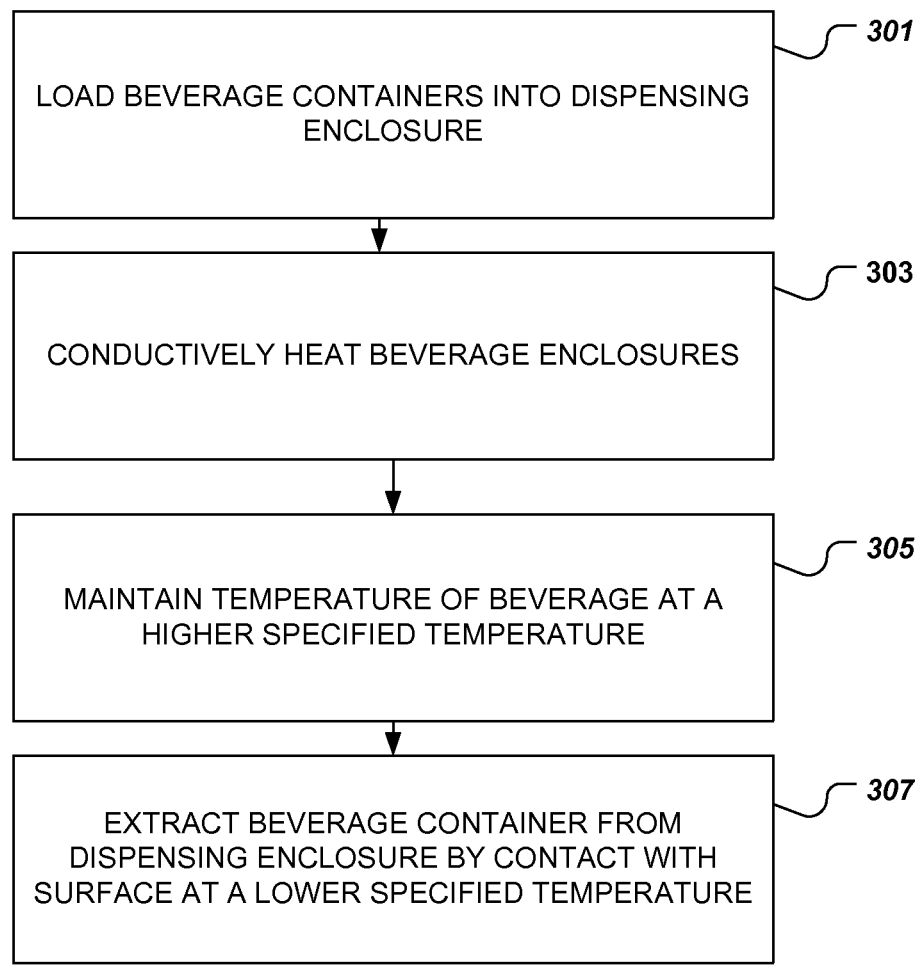
FIG. 2 is a flowchart showing steps in a method for dispensing a hot beverage in accordance with an embodiment of the present invention.

Typical steps in the operation of beverage dispensing system 100 are depicted in the flowchart of FIG. 2. One or more beverage containers 500 (shown in FIGS. 4A, 4B and 5) are loaded (301) into dispensing enclosure 110 in such a manner as to establish thermal contact with heating surface 300. This provides of conductive heating (303) of the beverage enclosures 505 that are the inner parts of the beverage containers 500, and the beverage is maintained (305) at a hot temperature that is desirable for consumption and that is referred to as a "higher specified temperature." Because insulating surround 520 allows for a temperature differential across the insulating surround, the outside surface 525 (shown in FIG. 4A) of insulating surround 520 may be maintained at a temperature that is not excessively hot to the touch, a temperature that may be referred to as a "lower specified temperature." It is to be understood that the terms "higher" and "lower" are to be understood solely in relation to one another, that is to say that the "higher" temperature is higher than the "lower" temperature. In other words, the internal ambient air temperature of the beverage dispensing system can be maintained at a temperature lower than the temperature of the heating surface 300. As a result the outside surface 525 of the insulating surround 520 can be at the ambient air temperature of the beverage dispensing system while the beverage inside the beverage enclosure 505 is kept hot by the heating surface 300. Thus, the beverage consumer may extract (307) a single beverage container 500, having a hot beverage therein, without experiencing contact with an uncomfortable higher temperature.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A method for dispensing a plurality of beverage containers, each beverage container including a beverage enclosure, the method comprising:
    a. retaining the plurality of beverage containers within a dispensing enclosure, each of said beverage containers including an insulating surround;
    b. conductively heating at least one beverage enclosure filled with a liquid by transferring heat to an exposed portion of each of the plurality of beverage enclosures left uncovered by said insulating surround, such that a temperature of the liquid exceeds a normative cutaneous heat pain threshold;
    c. maintaining the temperature of the liquid at a specified temperature above the normative cutaneous heat pain threshold by means of a temperature-controlled electrical heating element; and
    d. providing for at least one beverage container of the liquid to be removed from within the dispensing enclosure by a consumer such that the consumer contacts only a surface characterized by a temperature below the normative cutaneous heat pain threshold while the liquid remains above the normative cutaneous heat pain threshold.

2. A method according to claim 1, where the liquid is a potable beverage.

3. A method according to claim 1, wherein the specified temperature exceeds 130° F.

\* \* \* \* \*